US012586947B2

(12) United States Patent
Miyamura et al.

(10) Patent No.: US 12,586,947 B2
(45) Date of Patent: Mar. 24, 2026

(54) CONNECTOR

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Tetsuya Miyamura, Mie (JP); Daisuke Saito, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 291 days.

(21) Appl. No.: 18/279,849

(22) PCT Filed: Feb. 14, 2022

(86) PCT No.: PCT/JP2022/005531
§ 371 (c)(1),
(2) Date: Aug. 31, 2023

(87) PCT Pub. No.: WO2022/185881
PCT Pub. Date: Sep. 9, 2022

(65) Prior Publication Data

US 2024/0154346 A1 May 9, 2024

(30) Foreign Application Priority Data

Mar. 5, 2021 (JP) ................................ 2021-035239

(51) Int. Cl.
*H01R 13/428* (2006.01)
*H01R 13/504* (2006.01)
*H01R 13/506* (2006.01)

(52) U.S. Cl.
CPC ......... *H01R 13/428* (2013.01); *H01R 13/504* (2013.01); *H01R 13/506* (2013.01)

(58) Field of Classification Search
CPC ... H01R 13/428; H01R 13/504; H01R 13/506
See application file for complete search history.

(56) References Cited

U.S. PATENT DOCUMENTS 4,971,580 A * 11/1990 Ward ................ H01R 13/4367 264/318
5,336,540 A 8/1994 Kato et al.
(Continued)

FOREIGN PATENT DOCUMENTS

CN 104279220 A 1/2015
JP 2014-053214 A 3/2014
(Continued)

OTHER PUBLICATIONS

International Search Report issued on Mar. 29, 2022 for WO 2022/185881 A1 (6 pages).

*Primary Examiner* — Zheng Song
(74) *Attorney, Agent, or Firm* — Venjuris, P.C.

(57) ABSTRACT

A connector (A) is provided with a terminal fitting (10) and a housing (20) for holding the terminal fitting (10). The housing (20) includes a first function portion (30) made of a flexible synthetic resin material and a second function portion (32) made of a synthetic resin material having a smaller specific weight than the first function portion (30). The connector (A) is lighter by a weight obtained by multiplying a specific weight difference of the first function portion (30) and the second function portion (32) by a volume of the second function portion (32) as compared to
(Continued)

a connector in which the entire housing (10) is made of the same material as the first function portion (30).

8 Claims, 11 Drawing Sheets

(56) References Cited

U.S. PATENT DOCUMENTS

| | | | | |
|---|---|---|---|---|
| 2017/0018874 | A1 | 1/2017 | Kida | |
| 2018/0261933 | A1 * | 9/2018 | Maesoba .............. | H01R 13/422 |
| 2022/0158387 | A1 * | 5/2022 | Hibino ................. | H01R 9/0518 |

FOREIGN PATENT DOCUMENTS

| | | | | | |
|---|---|---|---|---|---|
| JP | 2014-229535 | A | | 12/2014 | |
| JP | 2017-103011 | A | | 6/2017 | |
| WO | 2013/161337 | A1 | | 10/2013 | |
| WO | WO-2018150854 | A1 | * | 8/2018 | ......... H01R 13/6477 |

* cited by examiner

CONNECTOR

CROSS REFERENCE TO RELATED APPLICATIONS

This application is a national phase of PCT application No. PCT/JP2022/005531, filed on 14 Feb. 2022, which claims priority from Japanese patent application No. 2021-035239, filed on 5 Mar. 2021, all of which are incorporated herein by reference.

TECHNICAL FIELD

The present disclosure relates to a connector.

BACKGROUND

Patent Document 1 discloses a connector reduced in weight by forming a lightening recess in a shield shell. The formation of the lightening recess for weight reduction can also be applied to a housing made of synthetic resin.

PRIOR ART DOCUMENT

Patent Document

Patent Document 1: JP 2017-103011 A

SUMMARY OF THE INVENTION

Problems to be Solved

The weight reduction by the lightening recess is limited only to an amount corresponding to a volume of the lightening recess. Thus, if the housing is shaped such that a multitude of lightening recesses cannot be formed or a lightening recess of a large volume cannot be formed, a sufficient weight reduction cannot be realized.

A connector of the present disclosure was completed on the basis of the above situation and aims for weight reduction.

Means to Solve the Problem

The present disclosure is directed to a connector with a terminal fitting and a housing for holding the terminal fitting, the housing including a first function portion made of a flexible synthetic resin material and a second function portion made of a synthetic resin material having a smaller specific weight than the first function portion.

Effect of the Invention

According to the present disclosure, a weight reduction can be achieved.

DETAILED DESCRIPTION TO EXECUTE THE INVENTION

Description of Embodiments of Present Disclosure

Figure 1:
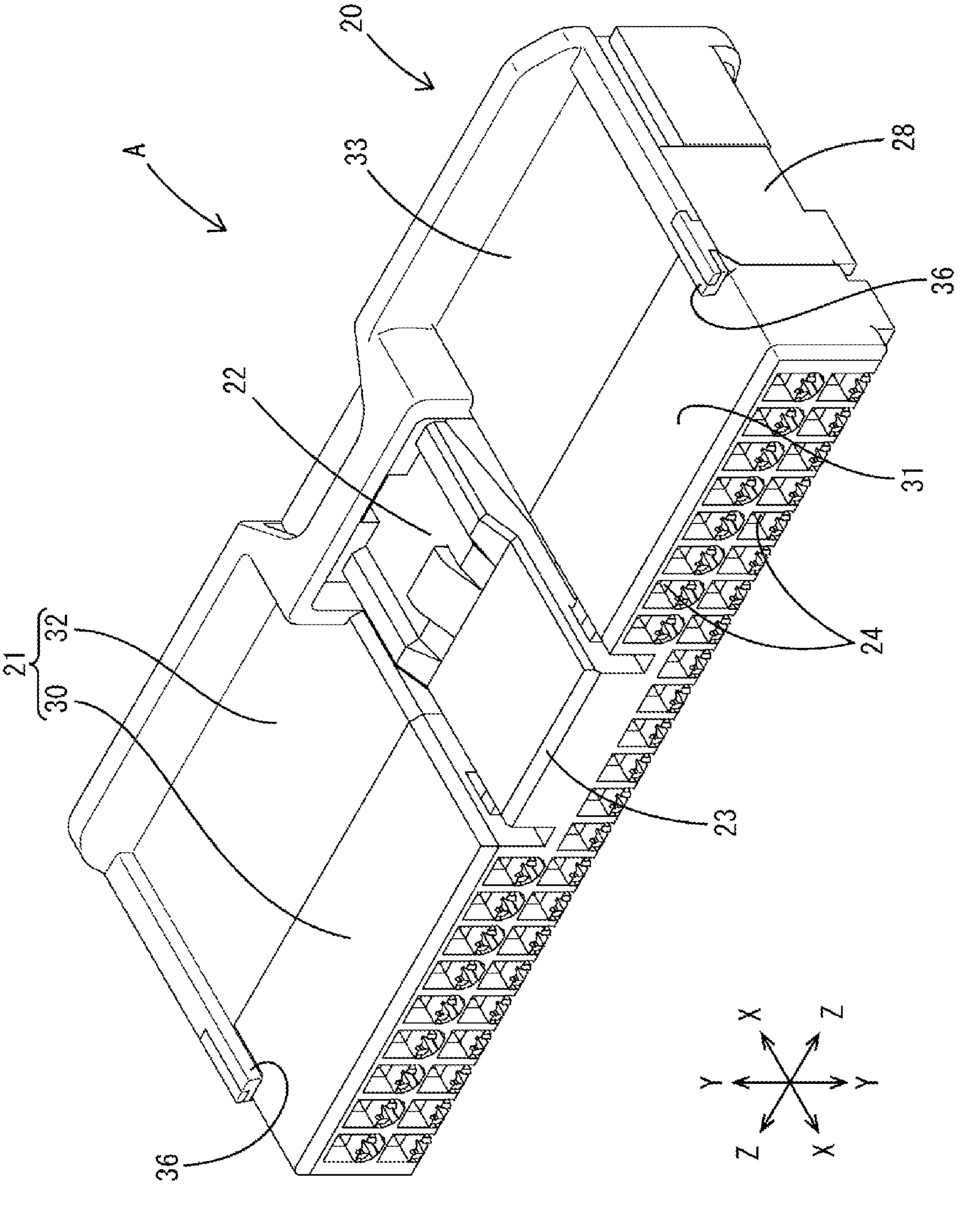
FIG. 1 is a perspective view of a connector of a first embodiment.

First, embodiments of the present disclosure are listed and described.

(1) The connector of the present disclosure is provided with a terminal fitting and a housing for holding the terminal fitting, the housing including a first function portion made of a flexible synthetic resin material and a second function portion made of a synthetic resin material having a smaller specific weight than the first function portion. The connector of the present disclosure is lighter by a weight obtained by multiplying a specific weight difference of the first and second function portions by a volume of the second function portion. Thus, the connector of the present disclosure can be reduced in weight.

(2) Preferably, the first and second function portions are integrated by two-color molding. According to this configuration, fewer manufacturing steps are required as compared to the case where the first and second function portions are molded in separate steps and these separately molded first and second function portions are united.

(3) Preferably, the first and second function portions include anchor portions for holding the first and second function portions in an integrated state by being fit to each other. According to this configuration, even if a material of the first function portion and that of the second function portion constitute a combination having low bondability, the first and second function portions can be held in the integrated state by a fitting structure of the anchor portions.

(4) Preferably, a volume of the first function portion is smaller than that of the second function portion. According to this configuration, since the volume of the first function portion having a larger specific weight than the second function portion is smaller than that of the second function portion, a weight reduction effect is high.

(5) Preferably, the first function portion includes a lock arm for holding the housing and a mating housing in a connected state, and anchor portions for integrating the first and second function portions are formed on a supporting portion serving as a deflection fulcrum of the lock arm. According to this configuration, since the rigidity of the supporting portion of the lock arm is enhanced by fitting the anchor portions to each other, the deflection of the lock arm is stabilized.

(6) Preferably, the housing includes a terminal accommodation chamber for accommodating the terminal fitting and a locking lance for retaining the terminal fitting by locking the terminal fitting in the terminal accommodation chamber, the first function portion is formed with a terminal holding portion constituting the terminal accommodation chamber, the terminal holding portion holding a part of the terminal fitting in a fitting state, and the locking lance is integrally formed to the first function portion. According to this configuration, the terminal fitting is retained by being locked by the locking lance with a part of the terminal fitting held by the terminal holding portion. Both the terminal holding portion for holding a part of the terminal fitting in the fitting state and the locking lance for retaining the terminal fitting are formed in the first function portion. Even if the material of the first function portion and that of the second function portion have different thermal expansion coefficients and the connector is used in a temperature-varying environment, the terminal fitting can be reliably retained.

(7) Preferably, in (6), a plurality of the terminal accommodation chambers are arranged side by side in a width direction of the housing, and anchor portions for integrating the first and second function portions are arranged in both end parts and a central part in the width direction of the housing. According to this configuration, the first and second function portions can be reliably integrated by the anchor portions arranged at three positions including the both end parts and the central part in the width direction of the housing.

(8) Preferably, the housing includes a terminal accommodation chamber for accommodating the terminal fitting, a locking lance for retaining the terminal fitting by locking the terminal fitting in the terminal accommodation chamber and a lock arm for holding the housing and a mating housing in a connected state, and the first function portion includes a retaining member constituting a part of an inner wall part of the terminal accommodation chamber and integrally formed with the locking lance and the lock arm arranged apart from the retaining member. According to this configuration, since a connecting portion for connecting the retaining member and the lock arm is not necessary, the first function portion can be reduced in weight accordingly.

(9) Preferably, in (8), the first function portion includes a plurality of the retaining members, and the plurality of retaining members are arranged apart from each other. According to this configuration, since a connecting portion for connecting the retaining members is not necessary, the first function portion can be reduced in weight accordingly.

DETAILS OF EMBODIMENTS OF PRESENT DISCLOSURE

First Embodiment

Figure 3:
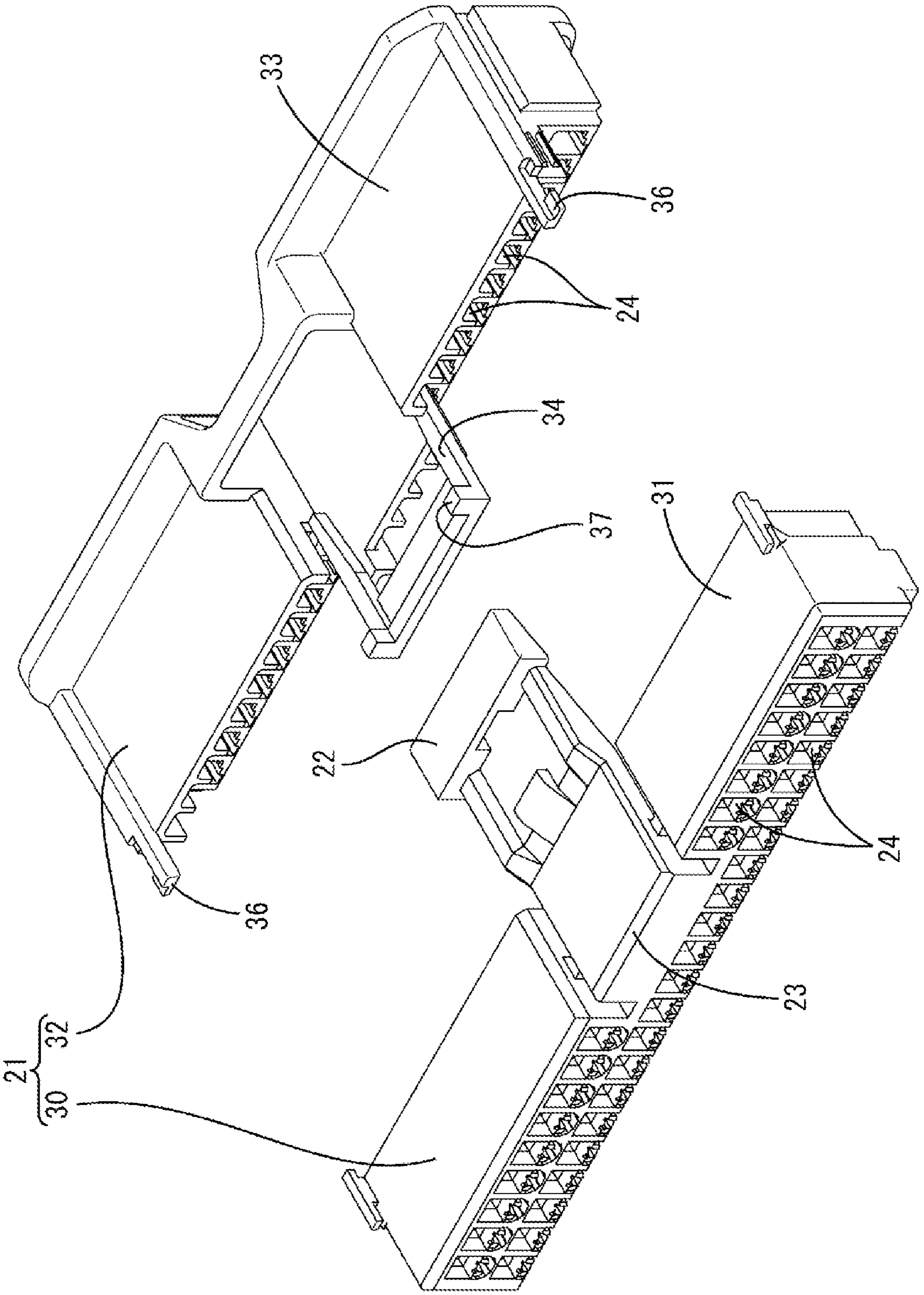
FIG. 3 is a perspective view showing a state where a first function portion and a second function portion are virtually separated.
Figure 4:
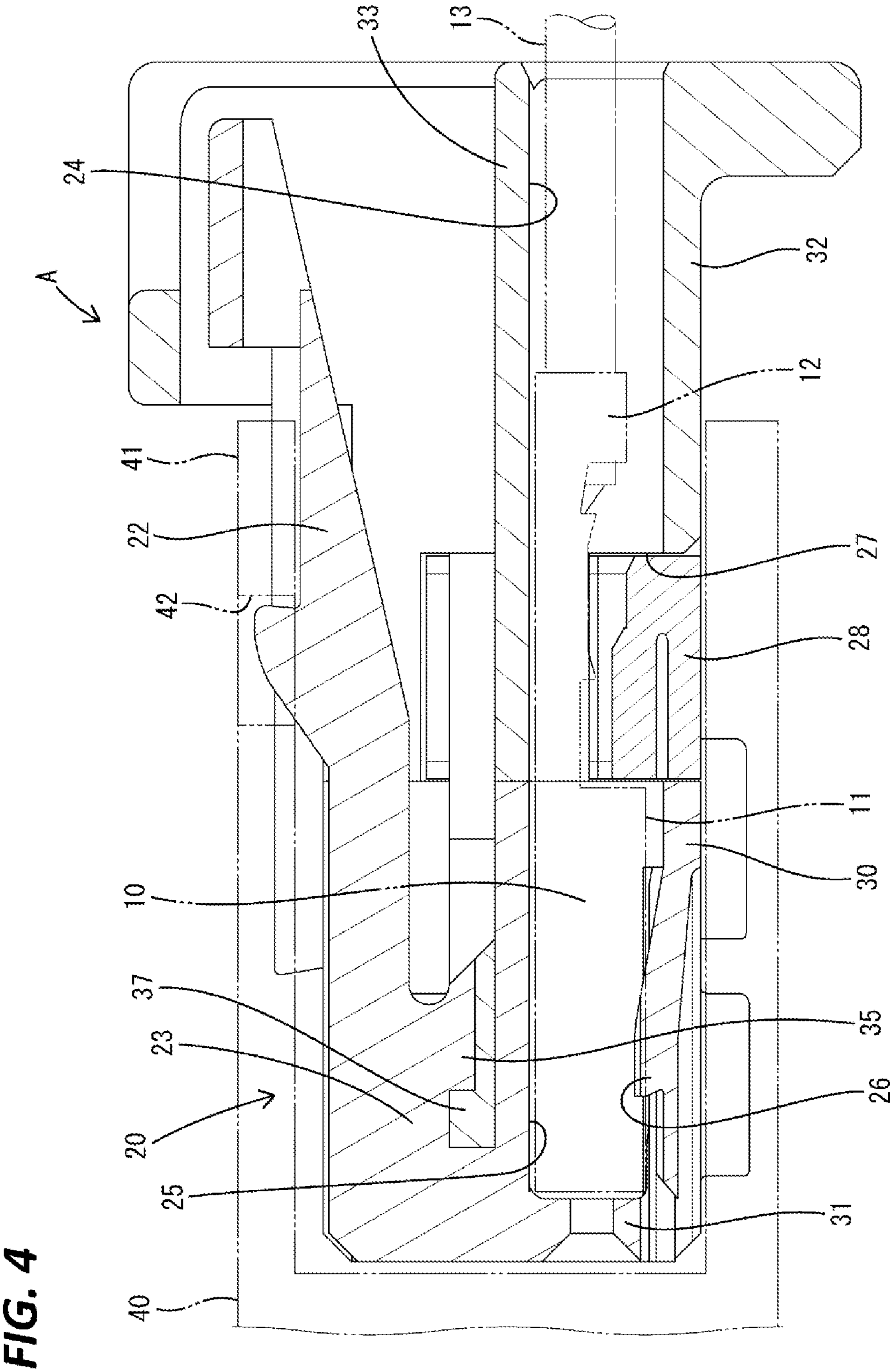
FIG. 4 is a side view in section of the connector.

A specific first embodiment of the present disclosure is described below with reference to FIGS. 1 to 4. Note that the present invention is not limited to these illustrations, but is represented by claims and intended to include all changes in the scope of claims and in the meaning and scope of equivalents. In the first embodiment, an oblique left-lower side in a direction parallel to an X-X axis in FIG. 1 and a left side in FIG. 4 are defined as a front side concerning a front-rear direction. Upper and lower sides along a direction parallel to a Y-Y axis in FIG. 1 are directly defined as upper and lower sides concerning a vertical direction. The vertical direction and a thickness direction are used as synonyms. A direction parallel to a Z-Z axis in FIG. 1 is defined as a lateral direction. The lateral direction and a width direction are used as synonyms.

A connector A of the first embodiment is provided with a plurality of terminal fittings 10 and a housing 20 for holding the terminal fittings 10. As shown in FIG. 4, the terminal fitting 10 has an elongated shape in the front-rear direction. A terminal body portion 11 in the form of a rectangular tube is formed in a front end part of the terminal fitting 10. A crimping portion 12 is formed in a rear end part of the terminal fitting 10. The crimping portion 12 is fixed to a front end part of a wire 13.

Figure 2:
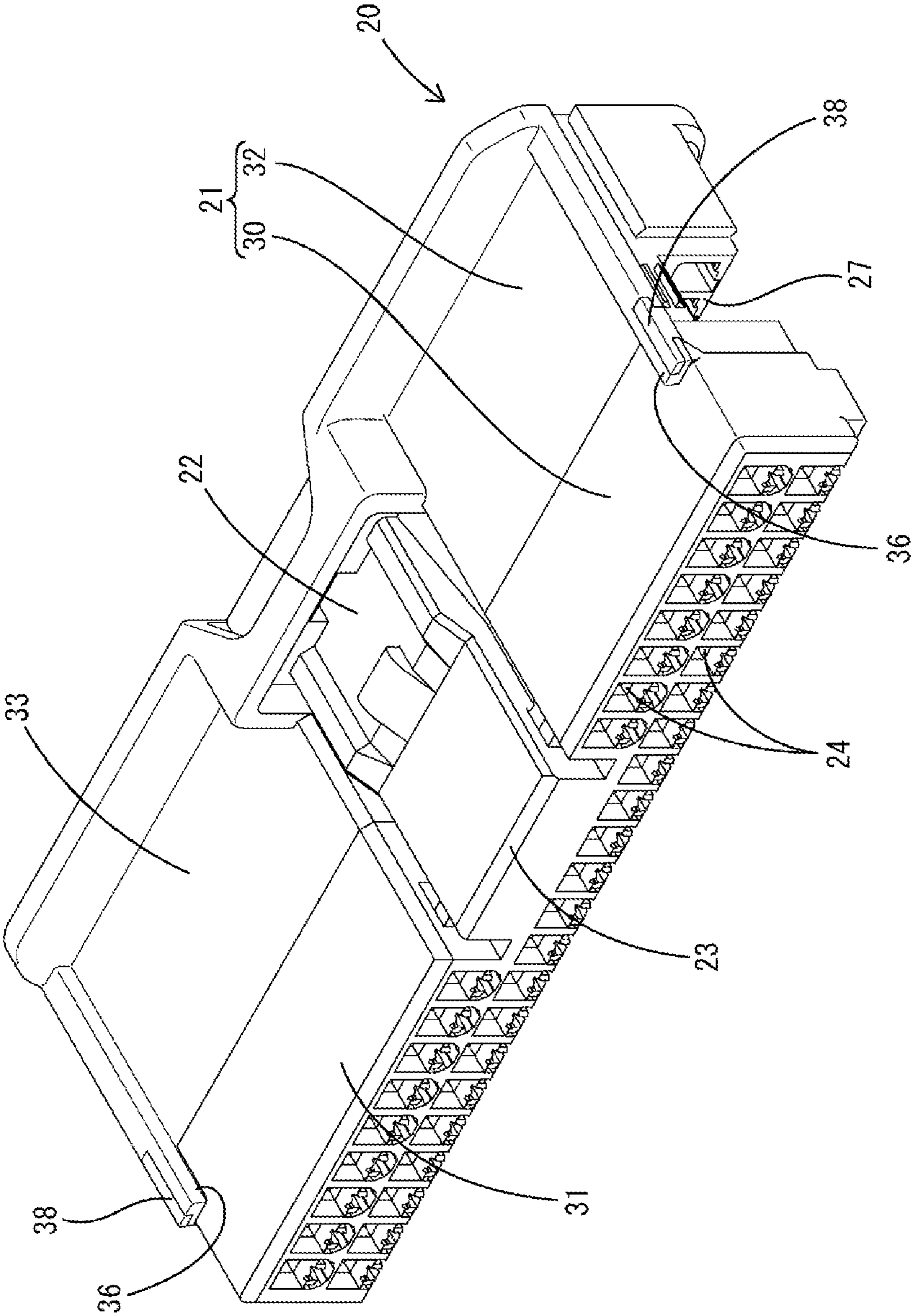
FIG. 2 is a perspective view of a housing with a retainer removed from a housing body.

As shown in FIGS. 1 and 2, the housing 20 has a flat rectangular parallelepiped shape as a whole. A dimension in the width direction of the housing 20 is larger than those in the front-rear direction and thickness direction, and the dimension in the front-rear direction is larger than that in the thickness direction. The housing 20 includes a housing body 21, which is a single component, and a retainer 28 to be assembled with the housing body 21.

A lock arm 22 is formed on the upper surface of the housing body 21. The lock arm 22 is arranged in a central part in the width direction of the housing body 21. The lock arm 22 is a plate-like part cantilevered rearward from a supporting portion 23 connected to a front end part of the housing body 21. The lock arm 22 can be resiliently displaced in the vertical direction, i.e. in directions toward and away from the upper surface of the housing body 21.

In the process of fitting the housing 20 into a receptacle 41 of a mating housing 40, the lock arm 22 interferes with the receptacle 41 and is deflected toward the upper surface of the housing body 21. If the housing 20 is fit into the receptacle 41 as shown in FIG. 4, the lock arm 22 resiliently returns upward and is locked into a lock hole 42. By the locking action of the lock arm 22 and the lock hole 42, the housing 20 and the mating housing 40 are locked in a connected state.

A plurality of terminal accommodation chambers 24 are formed side by side in the width direction orthogonal to a length direction of the terminal fittings 10 in the housing body 21. The terminal accommodation chamber 24 is a space elongated in the front-rear direction. A front end part of the terminal accommodation chamber 24 functions as a terminal holding portion 25 (see FIG. 4). A locking lance 26 is formed in the terminal holding portion 25. The locking lance 26 is resiliently displaceable in the vertical direction. As shown in FIGS. 2 and 4, a mounting hole 27 communicating with all the terminal accommodation chambers 24 is formed in the lower surface of the housing body 21. The retainer 28 mounted into the mounting hole 27 is movable in the vertical direction between a complete locking position and a temporary locking position below the complete locking position.

The terminal fitting 10 is inserted into the terminal accommodation chamber 24 from behind the housing 20 with the retainer 28 located at the temporary locking position. If the terminal fitting 10 is inserted into the terminal accommodation chamber 24, the terminal body portion 11 is fit into the terminal holding portion 25 and the locking lance 26 locks the terminal body portion 11 as shown in FIG. 4. If the retainer 28 at the temporary locking position is pushed to the complete locking position after the insertion of the terminal fittings 10, the retainer 28 locks the rear ends of the terminal body portions 11. The terminal fittings 10 are retained by a primary locking action by the locking lances 26 and a secondary locking action by the retainer 28.

The housing body 21 is a single component formed by integrating the first function portion 30 made of synthetic resin and the second function portion 32 likewise made of synthetic resin by two-color molding. In the first embodiment, resilient PBT (polybutylene terephthalate) is used as the synthetic resin material of the first function portion 30. A specific weight of PBT is about 1.31 to 1.38. The synthetic resin material of the second function portion 32 is PP (polypropylene) having a smaller specific weight than the material of the first function portion 30. The specific weight of PP is about 0.91 to 1.09. A volume of the first function portion 30 is smaller than that of the second function portion 32.

The first function portion 30 includes all the terminal holding portions 25, all the locking lances 26 and the lock arm 22. The first function portion 30 is a single part having a front accommodating portion 31 including the terminal holding portions 25 of all the terminal accommodation chambers 24 of the housing body 21 and the lock arm 22. As shown in FIG. 3, the front accommodating portion 31 has a rectangular shape elongated in the width direction. In the front accommodating portion 31, all the terminal holding portions 25 are integrally connected, and the locking lance 26 is formed in each terminal holding portion 25. The front accommodating portion 31 and the lock arm 22 are connected to each other. The supporting portion 23 of the lock arm 22 is connected to the upper surface of the front accommodating portion 31, and the lock arm 22 is cantilevered rearward from the front accommodating portion 31. The lock arm 22 is resiliently displaceable in the vertical direction with respect to the front accommodating portion 31.

The second function portion 32 is a single part constituting parts of the housing body 21 other than the first function portion 30. The second function portion 32 is a single part having a rear accommodating portion 33 including parts behind the terminal holding portions 25, out of all the terminal accommodation chambers 24, and an arm-like holding portion 34. As shown in FIG. 3, the arm-like holding portion 34 is cantilevered forward from a central part in the width direction of the second function portion 32. With the first and second function portions 30, 32 united, the front and rear accommodating portions 31, 33 are arranged and connected in the front-rear direction, whereby the terminal accommodation chambers 24 and the mounting hole 27 are configured. The lock arm 22 is arranged to cover the upper surface of the rear accommodating portion 33, and a front end part of the arm-like holding portion 34 slips into a gap between the upper surface of the front accommodating portion 31 and the lower surface of the lock arm 22.

The first function portion 30 includes one first center anchor portion 35 and a pair of left and right first side anchor portions 36. The second function portion 32 includes one second center anchor portion 37 and a pair of left and right second side anchor portions 38. Each anchor portion 35, 36, 37, 38 has an uneven shape or stepped shape. The first center anchor portion 35 is formed on the supporting portion 23 of the lock arm 22 located in a central part in the lateral direction of the housing 20 (see FIG. 4). As shown in FIGS. 1 to 3, the first side anchor portions 36 are formed in both left and right end parts of the front accommodating portion 31. As shown in FIG. 3, the second center anchor portion 37 is formed on a front end part of the arm-like holding portion 34. As shown in FIGS. 1 to 3, the second side anchor portions 38 are formed in both left and right end parts of the rear accommodating portion 33.

The first and second center anchor portions 35, 37 are locked and fit in contact with each other in the front-rear direction, vertical direction and lateral direction. By the fitting of the both center anchor portions 35, 37 to each other, the first and second function portions 30, 32 are held not to be displaced in three-dimensional directions. The pair of first side anchor portions 36 and the pair of second side anchor portions 38 are locked and fit in contact with each other in the front-rear direction, vertical direction and lateral direction. By the fitting of the both side anchor portions 36, 38 to each other, the first and second function portions 30, 32 are held not to be displaced in three-dimensional directions.

The housing body 21 is manufactured by two-color molding. In two-color molding, a primary molded article is first molded by an unillustrated primary mold. Subsequently, the primary molded article is set in an unillustrated secondary mold, and a secondary molded portion is united with the primary molded article at the same time as the secondary molded portion constituting the housing body 22 is molded by the secondary mold. The primary molded article becomes a primary molded portion constituting the housing body 21 by being united with the secondary molded portion.

According to this manufacturing method by two-color molding, the housing body 21 can be manufactured in a procedure of molding the first function portion 30 serving as the primary molded article and the primary molded portion in a primary molding step and molding the second function portion 32 serving as the secondary molded portion in a secondary molding step. In this case, a specific weight of the primary molded portion is larger than that of the secondary molded portion. Further, as another procedure, the second function portion 32 serving as the primary molded article and the primary molded portion may be molded in the primary molding step and the first function portion 30 serving as the secondary molded portion may be molded in the secondary molding step. In this case, the specific weight of the primary molded portion is smaller than that of the secondary molded portion.

The connector A of the first embodiment is provided with the terminal fittings 10 and the housing 20. The housing 20 includes the first function portion 30 made of the flexible synthetic resin material and the second function portion 32 made of the synthetic resin material having a smaller specific weight than the first function portion 30. In the connector A of the first embodiment, the housing 20 is made of a plurality of types of synthetic resin materials having different specific weights. Accordingly, the connector A of the first embodiment is lighter by a weight obtained by multiplying a specific weight difference of the first and second function portions 30, 32 by the volume of the second function portion 32 as compared to a connector in which the entire housing 20 is made of the same material as the first function portion 30 having a large specific weight. Thus, the connector A of the first embodiment is reduced in weight.

The first and second function portions 30, 32 are integrated by two-color molding. The connector A of the first embodiment requires fewer manufacturing steps as compared to the case where the first and second function portions are molded in separate steps and these separately molded first and second function portions are assembled and united.

PBT, which is the material of the first function portion 30, and PP, which is the material of the second function portion 32, constitute a combination having low bondability at the time of two-color molding. Thus, there is a concern that the first and second function portions 30, 32 are separated.

However, the first and second function portions 30, 32 of the first embodiment include the anchor portions 35, 36, 37 and 38 for holding the first and second function portions 30, 32 in an integrated state by being fit to each other. By a fitting structure of the anchor portions 35, 36 of the first function portion 30 and the anchor portions 37, 38 of the second function portion 32, the first and second function portions 30, 32 can be held in the integrated state.

In the connector A of the first embodiment, the volume of the first function portion 30 having a larger specific weight than the second function portion 32 is smaller than that of the second function portion 32. Accordingly, the connector A of the first embodiment has a high weight reduction effect as compared to the case where the volume of the first function portion is larger than that of the second function portion and the case where the first and second function portions have the same volume.

The first function portion 30 includes the lock arm 22 for holding the housing 20 and the mating housing 40 in the connected state. The first center anchor portion 35 is formed on the supporting portion 23 serving as a deflection fulcrum of the lock arm 22. According to this configuration, since the rigidity of the supporting portion 23 of the lock arm 22 is enhanced by fitting the both center anchor portions 35, 37 to each other, the deflection of the lock arm 22 is stabilized.

The housing 20 includes the terminal accommodation chambers 24 for accommodating the terminal fittings 10 and the locking lances 26 for retaining the terminal fittings 10 by locking the terminal fittings 10 in the terminal accommodation chambers 24. The first function portion 30 is formed with the terminal holding portions 25 constituting the terminal accommodation chambers 24 and holding parts of the terminal fittings 10 in a fitting state. The locking lances 26 are integrally formed to the first function portion 30. With the terminal body portions 11, which are parts of the terminal fittings 10, held in the terminal holding portions 25, the terminal fittings 10 are retained by being locked by the locking lances 26. The terminal holding portions 25 for holding the terminal body portions 11 of the terminal fittings 10 in the fitting state and the locking lances 26 for retaining the terminal fittings 10 are both formed in the first function portion 30. Therefore, even if the material of the first function portion 30 and that of the second function portion 32 have different thermal expansion coefficients and the connector is used in a temperature-varying environment, the terminal fittings 10 can be reliably retained.

The plurality of terminal accommodation chambers 24 are arranged side by side in the width direction of the housing 20 in the housing 20. The first and second center anchor portions 35, 37 are arranged in the central part in the width direction of the housing 20. The pair of first side anchor portions 36 and the pair of second side anchor portions 38 are arranged in the both end parts in the width direction of the housing 20. According to this configuration, the first and second function portions 30, 32 can be reliably integrated by the anchor portions 35, 36, 37 and 38 arranged at three positions including the both end parts and the central part in the width direction of the housing 20.

Second Embodiment

Figure 5:
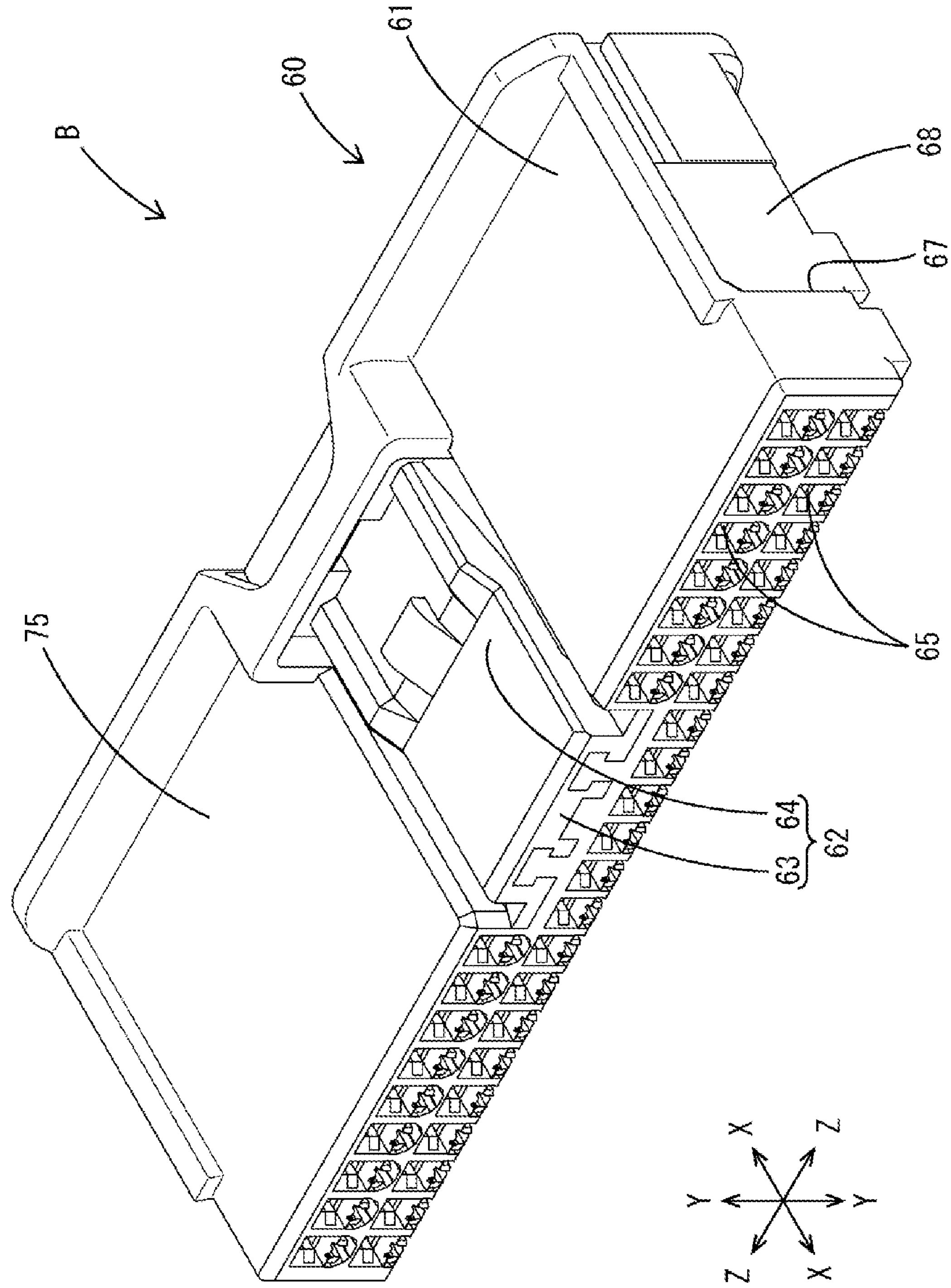
FIG. 5 is a perspective view of a connector of a second embodiment.
Figure 12:
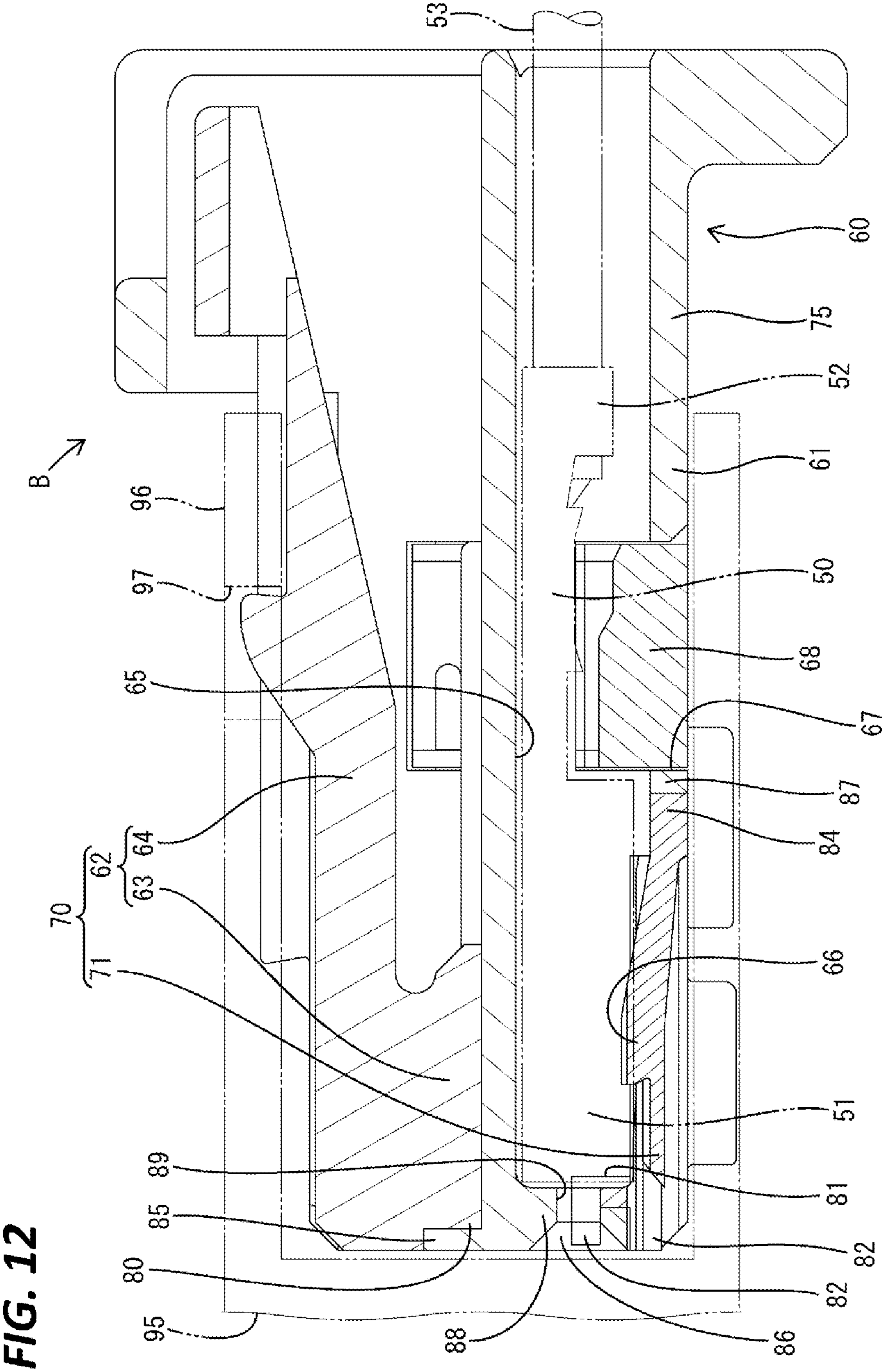
FIG. 12 is a section along S-S of FIG. 11.

A specific second embodiment of the present disclosure is described below with reference to FIGS. 5 to 12. Note that the present invention is not limited to these illustrations, but is represented by claims and intended to include all changes in the scope of claims and in the meaning and scope of equivalents. In the second embodiment, an oblique left-lower side in a direction parallel to an X-X axis in FIG. 5 and a left side in FIG. 12 are defined as a front side concerning a front-rear direction. Upper and lower sides along a direction parallel to a Y-Y axis in FIG. 5 are directly defined as upper and lower sides concerning a vertical direction. The vertical direction and a thickness direction are used as synonyms. A direction parallel to a Z-Z axis in FIG. 5 is defined as a lateral direction. The lateral direction and a width direction are used as synonyms.

A connector B of the second embodiment is provided with a plurality of terminal fittings 50 and a housing 60 for holding the terminal fittings 50. As shown in FIG. 12, the terminal fitting 50 has an elongated shape in the front-rear direction. A terminal body portion 51 in the form of a rectangular tube is formed in a front end part of the terminal fitting 50. A crimping portion 52 is formed in a rear end part of the terminal fitting 50. The crimping portion 52 is fixed to a front end part of a wire 53.

Figure 6:
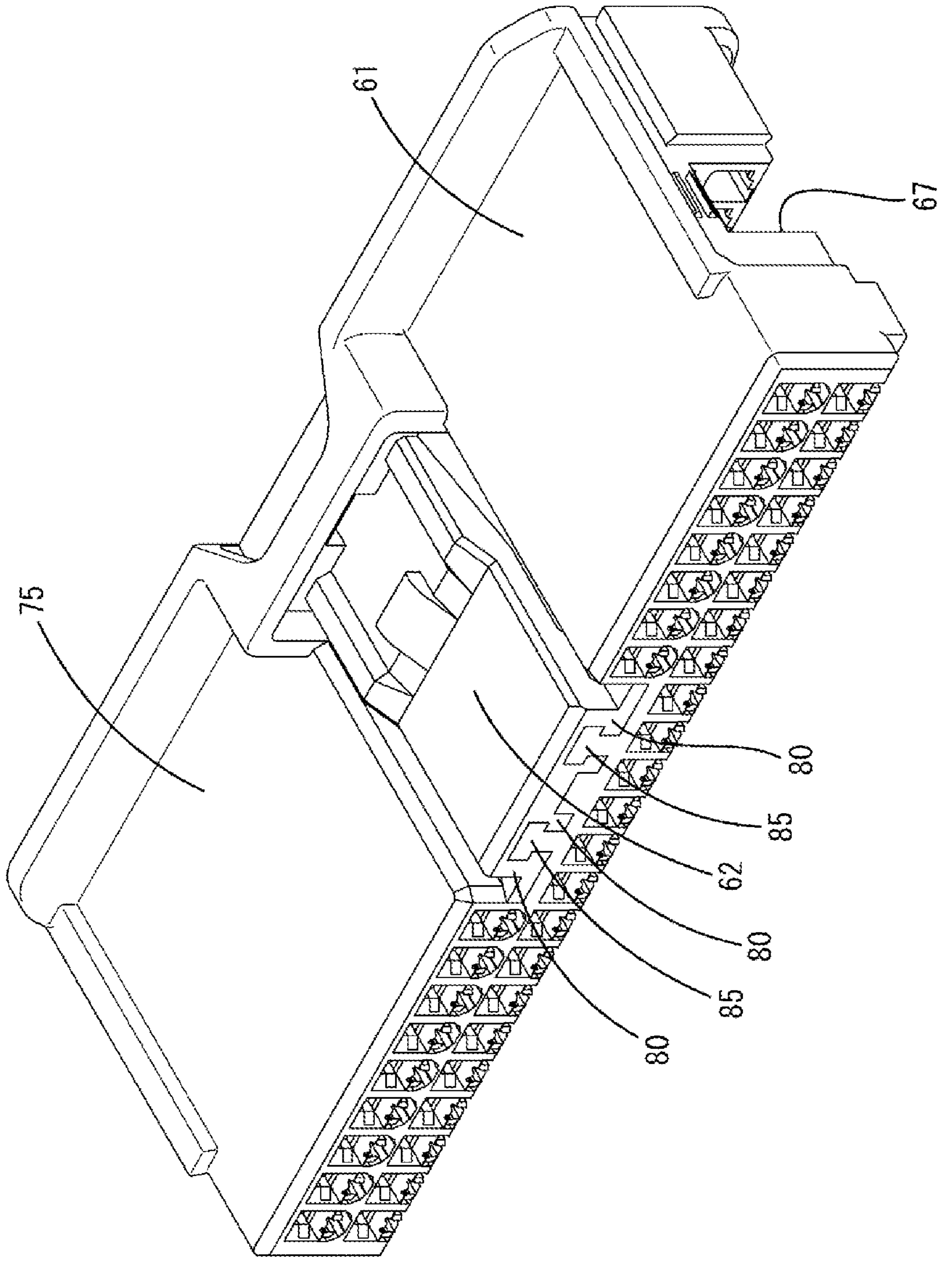
FIG. 6 is a perspective view of a housing with a retainer removed from a housing body.

As shown in FIGS. 5 and 6, the housing 60 has a flat rectangular parallelepiped shape as a whole. That is, a dimension in the width direction of the housing 60 is larger than those in the front-rear direction and thickness direction, and the dimension in the front-rear direction is larger than that in the thickness direction. The housing 60 includes a housing body 61, which is a single component, and a retainer 68 to be assembled with the housing body 61.

A lock arm 62 is formed on the upper surface of the housing body 61. The lock arm 62 is arranged in a central part in the width direction of the housing body 61. The lock arm 62 is a single component including a supporting portion 63 connected to a front end part of the housing body 61 and a plate-like arm portion 64 cantilevered rearward from the supporting portion 63. The lock arm 62 can be resiliently displaced in the vertical direction, i.e. in directions toward and away from the upper surface of the housing body 61.

In the process of fitting the housing 60 into a receptacle 96 of a mating housing 95, the lock arm 62 interferes with a lock hole 97 of the receptacle 96 and is deflected toward the upper surface of the housing body 61. If the housing 60 is fit into the receptacle 96 as shown in FIG. 12, the lock arm 62 resiliently returns upward and is locked into the lock hole 97. By the locking action of the lock arm 62 and the lock hole 97, the housing 60 and the mating housing 95 are locked in a connected state.

A plurality of terminal accommodation chambers 65 are formed side by side in the width direction orthogonal to a length direction of the terminal fittings 50 in the housing body 61. As shown in FIG. 12, the terminal accommodation chamber 65 is a space elongated in the front-rear direction. A locking lance 66 resiliently displaceable in the vertical direction is formed in a front end part of the terminal accommodation chamber 65. A mounting hole 67 communicating with all the terminal accommodation chambers 65 is formed in the lower surface of the housing body 61. The retainer 68 mounted into the mounting hole 67 is movable in the vertical direction between a complete locking position and a temporary locking position below the complete locking position.

The terminal fitting 50 is inserted into the terminal accommodation chamber 65 from behind the housing 60 with the retainer 68 located at the temporary locking position. If the terminal fitting 50 is inserted into the terminal accommodation chamber 65, the locking lance 66 locks the terminal body portion 51. If the retainer 68 at the temporary locking position is pushed to the complete locking position after the insertion of the terminal fittings 50, the retainer 68 locks the rear ends of the terminal body portions 51. The terminal fittings 50 are retained by a primary locking action by the locking lances 66 and a secondary locking action by the retainer 68.

The housing body 61 is a single component formed by integrating a first function portion 70 made of synthetic resin and a second function portion 75 likewise made of synthetic resin by two-color molding. In the second embodiment, resilient PBT (polybutylene terephthalate) is used as the synthetic resin material of the first function portion 70. A specific weight of PBT is about 1.31 to 1.38. The synthetic resin material of the second function portion 75 is PP (polypropylene) having a smaller specific weight than the material of the first function portion 70. The specific weight of PP is about 0.91 to 1.09. A volume of the first function portion 70 is smaller than that of the second function portion 75.

Figure 7:
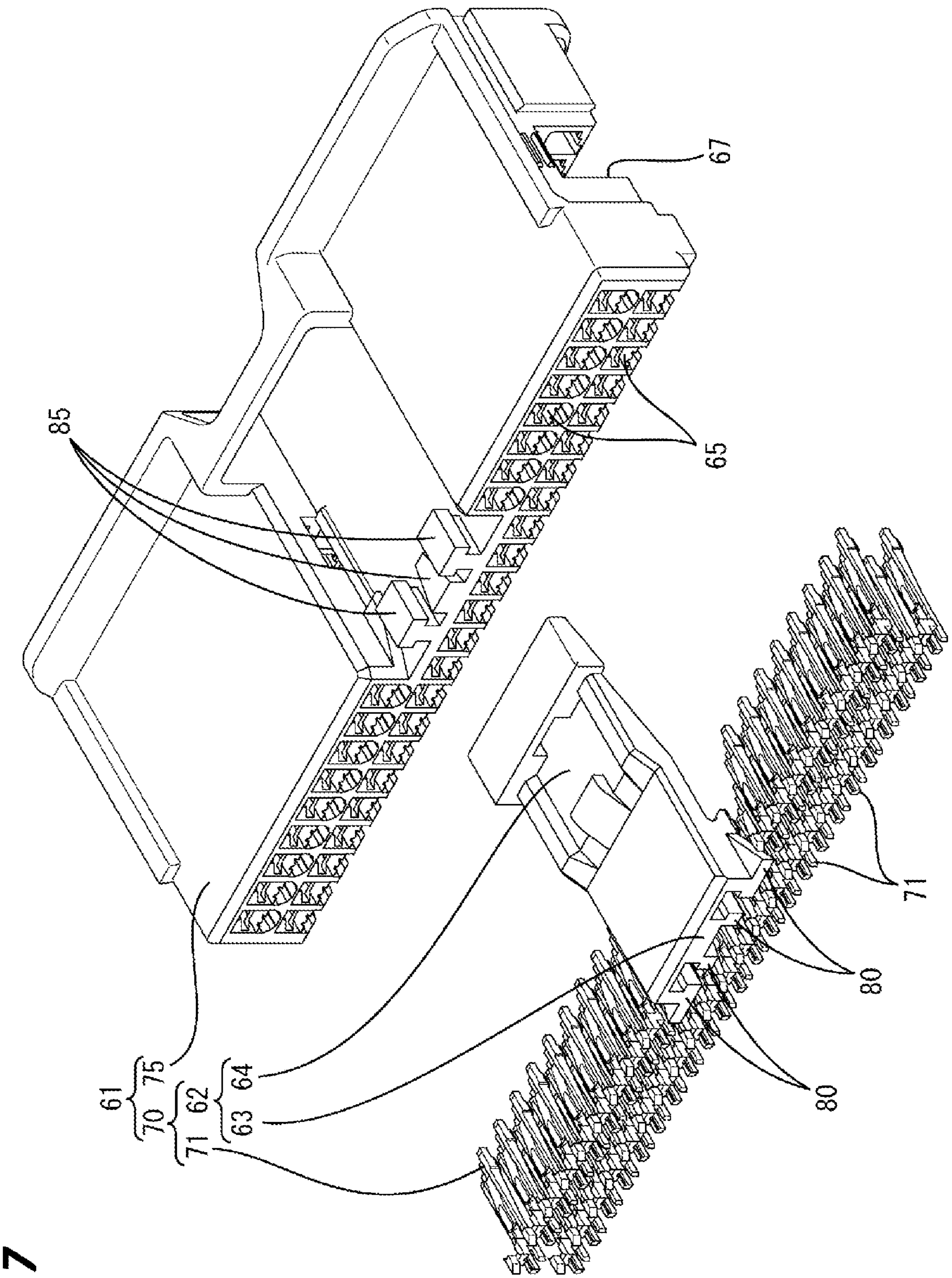
FIG. 7 is a perspective view showing a state where a first function portion and a second function portion are virtually separated.

As shown in FIGS. 7 and 12, the first function portion 70 is composed of one lock arm 62 and a plurality of retaining members 71. The plurality of retaining members 71 are individually and integrally formed with all the (plurality of) locking lances 66. The plurality of retaining members 71 are arranged at positions separated from each other. The lock arm 62 is arranged at a position separated from all the retaining members 71. The first function portion 70 is composed of a plurality of independent parts arranged at positions separated from each other.

Figure 9:
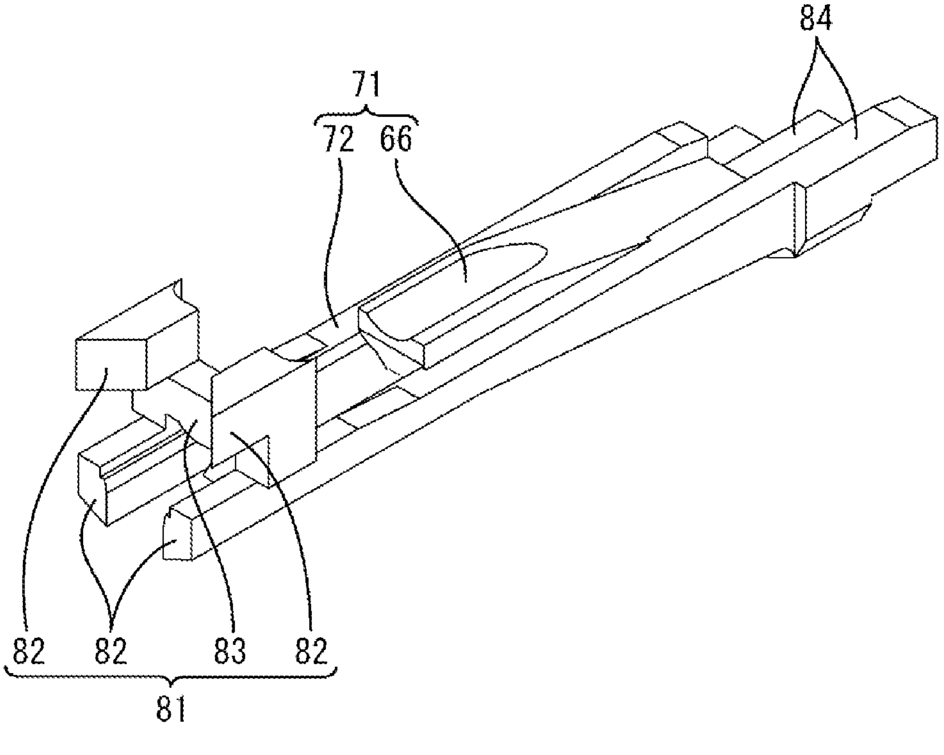
FIG. 9 is a perspective view of a retaining member viewed obliquely from an upper-front side.
Figure 10:
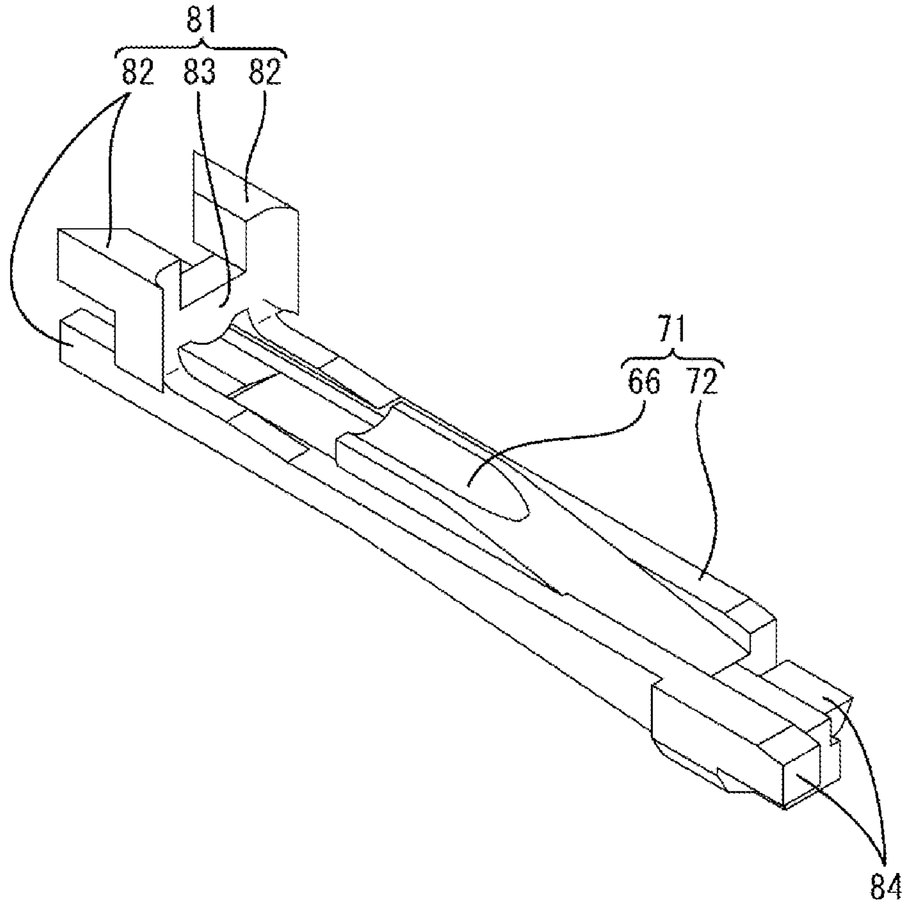
FIG. 10 is a perspective view of the retaining member viewed obliquely from an upper-rear side.
Figure 11:
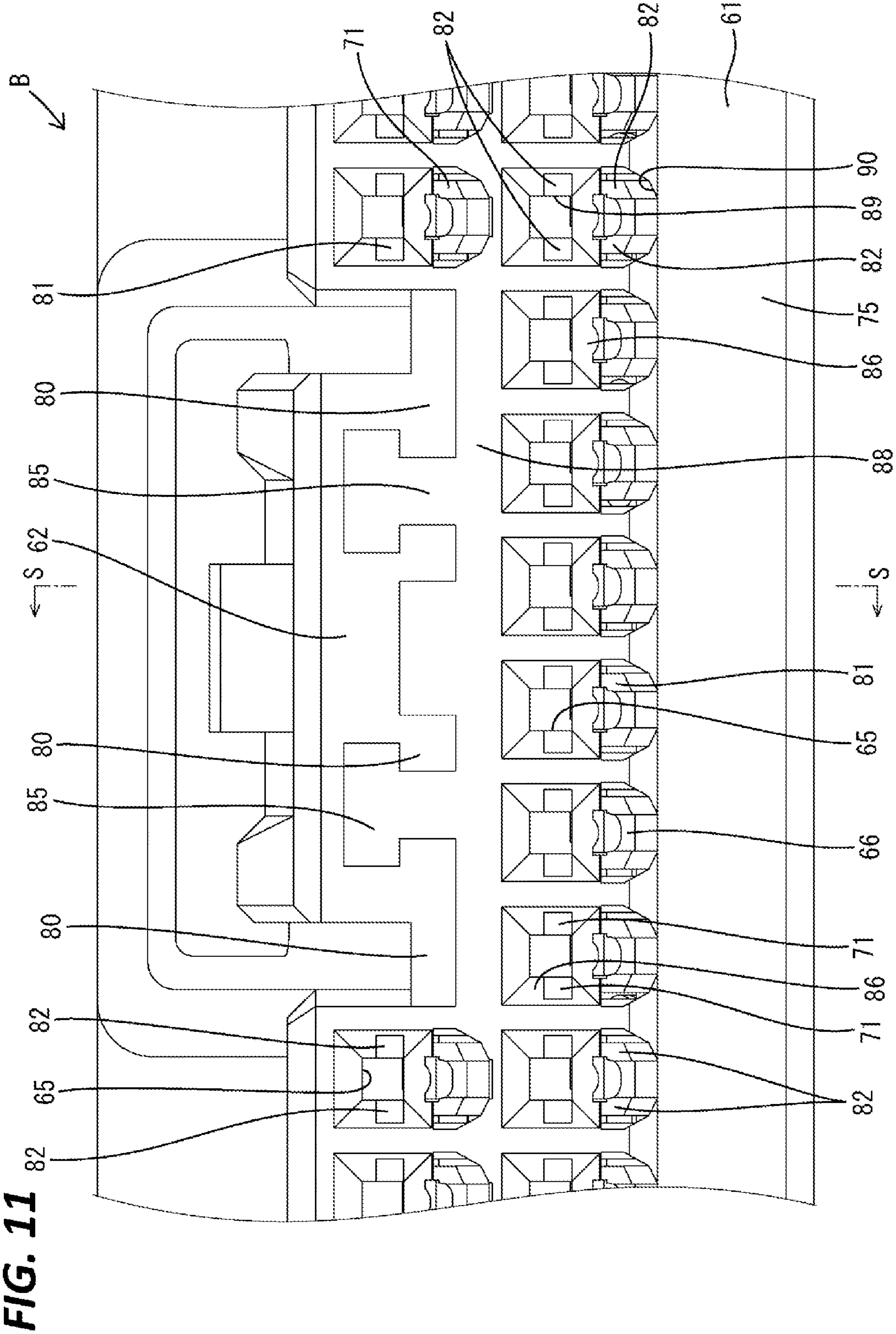
FIG. 11 is a partial enlarged front view of the housing.

The lock arm 62 is a single component including the supporting portion 63 and the plate-like arm portion 64 cantilevered rearward from the supporting portion 63. The arm portion 64 can be resiliently displaced in the vertical direction with respect to the supporting portion 63. As shown in FIGS. 9 and 10, one retaining member 71 is a single unit including a plate-like base portion 72 elongated in the front-rear direction and the locking lance 66. The locking lance 66 has a shape cantilevered forward along the upper surface of the base portion 72. The locking lance 66 is resiliently relatively displaceable in the vertical direction with respect to the base portion 72.

The second function portion 75 is a single part constituting parts of the housing body 61 other than the first function portion 70. All the terminal accommodation chambers 65 and the mounting hole 67 are formed in the second function portion 75. The lock arm 62 is arranged to cover the upper surface of the second function portion 75. The supporting portion 63 of the lock arm 62 is connected to a central part in the lateral direction of the front end part of the second function portion 75. The lock arm 62 can be resiliently displaced in the vertical direction to move toward and away from the upper surface of the second function portion 75 with the supporting portion 63 as a fulcrum.

The retaining member 71 is accommodated in a front end part of each terminal accommodation chamber 65. The base portion 72 is arranged along the inner wall surface of the terminal accommodation chamber 65. The locking lance 66 is arranged to face the inside of the terminal accommodation chamber 65. The locking lance 66 can be resiliently displaced in the vertical direction with a rear end part of the locking lance 66 as a fulcrum.

The first function portion 70 includes one first center anchor portion 80, a plurality of first front anchor portions 81 and a plurality of first rear anchor portions 84. The second function portion 75 includes one second center anchor portion 85, a plurality of second front anchor portions 86 and a plurality of second rear anchor portions 87.

Figure 8:
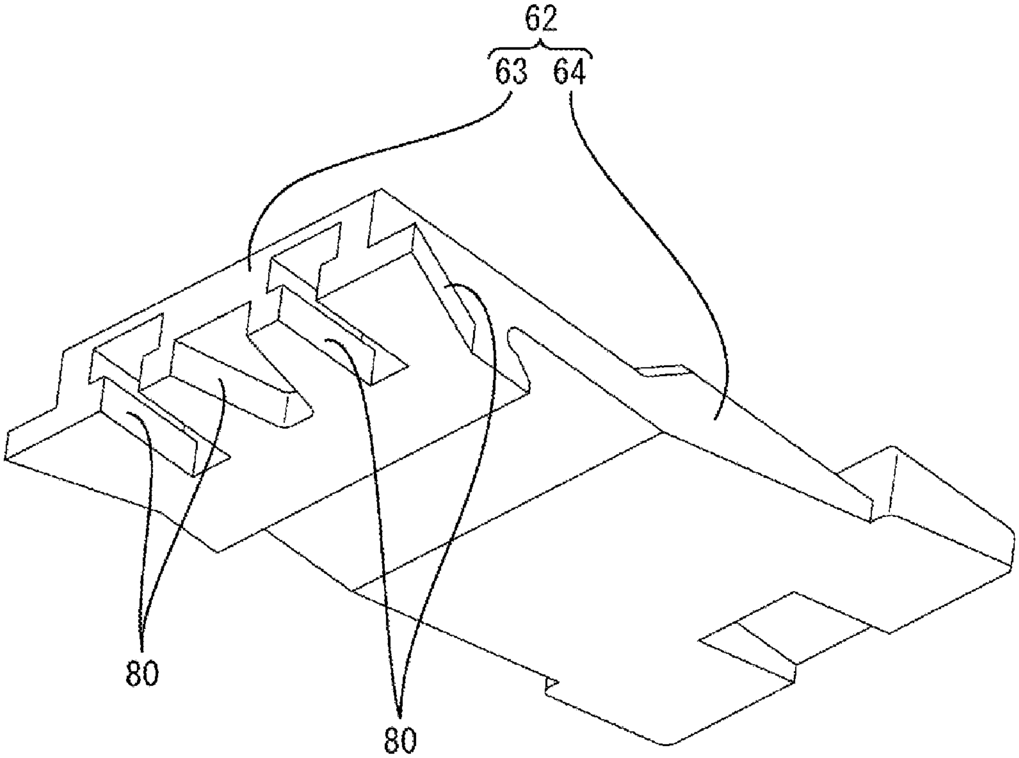
FIG. 8 is a perspective view of a lock arm viewed obliquely from a lower-front side.

As shown in FIGS. 7, 8 and 12, the first center anchor portion 80 is formed on the supporting portion 63 of the lock arm 62. As shown in FIGS. 9 and 10, the first front anchor portion 81 is formed in a front end part of the base portion 72 of the retaining member 71. The first front anchor portions 81 are arranged at intervals in the vertical and lateral directions. The first front anchor portion 81 includes four projections 82 projecting forward and a coupling portion 83 connecting rear end parts of the four projections 82. The first rear anchor portion 84 is formed in a rear end part of the base portion 72.

As shown in FIGS. 6 and 7, the second center anchor portion 85 is formed in a central part in the lateral direction of a front end part of the upper surface of the second function portion 75. As shown in FIG. 12, the second front anchor portion 86 is formed in a front wall portion 88 defining the front end of the terminal accommodation chamber 65. The front wall portion 88 is formed with a tab insertion opening 89 and a jig insertion opening 90. The tab insertion opening 89 is an opening for inserting a tab of an unillustrated mating terminal into the terminal accommodation chamber 65. The jig insertion opening 90 is an opening for inserting an unillustrated jig for disengaging the locking lance 66 from the terminal fitting 50. As shown in FIG. 12, the second rear anchor portion 87 is formed at a position rearward of the second front anchor portion 86, out of an inner wall part of the terminal accommodation chamber 65.

The first and second center anchor portions 80, 85 are locked and fit in contact with each other in the front-rear direction, vertical direction and lateral direction. By the fitting of the both center anchor portions 80, 85 to each other, the lock arm 62 and the second function portion 75 are held not to be displaced in three-dimensional directions.

The first front anchor portion 81 and the second front anchor portion 86 are locked and fit in contact with each other in the front-rear direction, vertical direction and lateral direction. Specifically, two upper projections 82, out of the four projections 82, are fit into both left and right side edge parts of an opening edge part of the tab insertion opening 89. Two lower projections 82, out of the four projections 82, are fit into both left and right side edge parts of an opening edge part of the jig insertion opening 90. The coupling portion 83 is fit to the rear surface of a partition wall portioning between the tab insertion opening 89 and the jig insertion opening 90. The first rear anchor portion 84 and the second rear anchor portion 87 are locked and fit in contact with each other in the rear-rear direction, vertical direction and lateral direction. By the fitting of the front anchor portions 81, 86 to each other and the fitting of the rear anchor portions 84, 87 to each other, the retaining members 71 and the second function portion 75 are held not to be displaced in three-dimensional directions.

The housing body 61 is manufactured by two-color molding. In two-color molding, a primary molded article is first molded by an unillustrated primary mold. Subsequently, the primary molded article is set in an unillustrated secondary mold, and a secondary molded portion is united with the primary molded article at the same time as the secondary molded portion constituting the housing body 61 is molded by the secondary mold. The primary molded article becomes a primary molded portion constituting the housing body 61 by being united with the secondary molded portion.

According to this manufacturing method by two-color molding, the housing body 61 can be manufactured in a procedure of molding the first function portion 70 serving as the primary molded article and the primary molded portion in a primary molding step and molding the second function portion 75 serving as the secondary molded portion in a secondary molding step. In this case, a specific weight of the primary molded portion is larger than that of the secondary molded portion. Further, as another procedure, the second function portion 75 serving as the primary molded article and the primary molded portion may be molded in the primary molding step and the first function portion 70 serving as the secondary molded portion may be molded in the secondary molding step. In this case, the specific weight of the primary molded portion is smaller than that of the secondary molded portion.

The connector B of the second embodiment is provided with the terminal fittings 50 and the housing 60. The housing 60 includes the first function portion 70 made of the flexible synthetic resin material and the second function portion 75 made of the synthetic resin material having a smaller specific weight than the first function portion 70. In the connector B of the second embodiment, the housing 60 is made of a plurality of types of synthetic resin materials having different specific weights. Accordingly, the connector B of the second embodiment is lighter by a weight obtained by multiplying a specific weight difference of the first and second function portions 70, 75 by the volume of the second function portion 75 as compared to a connector in which the entire housing 60 is made of the same material as the first function portion 70 having a large specific weight. Thus, the connector B of the second embodiment is reduced in weight.

The first and second function portions 70, 75 are integrated by two-color molding. The connector B of the second embodiment requires fewer manufacturing steps as compared to the case where the first and second function portions are molded in separate steps and these separately molded first and second function portions are assembled and united.

PBT, which is the material of the first function portion 70, and PP, which is the material of the second function portion 75, constitute a combination having low bondability at the time of two-color molding. Thus, there is a concern that the first and second function portions 70, 75 are separated. As a countermeasure against this, the first and second function portions 70, 75 of the second embodiment include the anchor portions 80, 81, 84, 85, 86 and 87 for holding the first and second function portions 70, 75 in an integrated state by being fit to each other. By a fitting structure of the anchor portions 80, 81 and 84 of the first function portion 70 and the anchor portions 85, 86 and 87 of the second function portion 75, the first and second function portions 70, 75 can be held in the integrated state.

In the connector B of the second embodiment, the volume of the first function portion 70 having a larger specific weight than the second function portion 75 is smaller than that of the second function portion 75. That is, a total volume of the lock arm 62 and all the retaining members 71 is smaller than the volume of the second function portion 75. A weight reduction effect of the connector B of the second embodiment is high as compared to the case where the total volume of the first function portion 70 is larger than the volume of the second function portion 75 and the case where the total volume of the first function portion 70 is equal to the volume of the second function portion 75.

The first function portion 70 includes the lock arm 62 for holding the housing 60 and the mating housing 95 in the connected state. The first and second center anchor portions 80, 85 are formed on the supporting portion 63 serving as a deflection fulcrum of the lock arm 62. According to this configuration, since the rigidity of the supporting portion 63 of the lock arm 62 is enhanced by fitting the both center anchor portions 80, 85 to each other, the deflection of the lock arm 62 is stabilized.

The housing 60 includes the terminal accommodation chambers 65 for accommodating the terminal fittings 50, the locking lances 66 for retaining the terminal fittings 50 by locking the terminal fittings 50 in the terminal accommodation chambers 65 and the lock arm 62 for holding the housing 60 and the mating housing 95 in the connected state. The first function portion 70 includes the retaining members 71 constituting parts of the inner wall parts of the terminal accommodation chambers 65 and integrally formed with the locking lances 66, and the lock arm 62 arranged apart from the retaining members 71. The lock arm 62 and the retaining members 71 are positioned via the second function portion 75 interposed between the lock arm 62 and the retaining members 71. According to this configuration, since a connecting portion for connecting the retaining members 71 and the lock arm 62 is not necessary, the first function portion 70 can be reduced in weight accordingly.

The first function portion 70 includes the plurality of retaining members 71, and the plurality of retaining members 71 are separated from each other. Adjacent ones of the retaining members 71 are positioned via the second function portion 75 interposed between the both retaining members 71. Since connecting portions connecting the adjacent ones of the retaining members 71 are not necessary, the first function portion 70 can be reduced in weight accordingly.

Other Embodiments

The present invention is not limited to the above described and illustrated embodiments, but is represented by claims. The present invention is intended to include all changes in the scope of claims and in the meaning and scope of equivalents and also include the following embodiments.

Although the first and second function portions are integrated by two-color molding in the first and second embodiments, the first and second function portions may be united after being molded in separate steps.

Although the first and second function portions are integrated by the anchor portions in the first and second embodiments, the anchor portions may not be formed if the material of the first function portion and that of the second function portion constitute a combination having high bondability.

Although the volume of the first function portion is smaller than that of the second function portion in the first and second embodiments, the volume of the first function portion may be equal to or larger than that of the second function portion.

Although the terminal holding portions, the locking lances and the lock arm are formed in the first function portion in the first embodiment, the terminal holding portions and the locking lances may be formed in the first function portion and the lock arm may be formed in the second function portion.

Although the material of the first function portion is PBT and that of the second function portion is PP in the first and second embodiments, a combination of the material of the first function portion and that of the second function portion is not limited to the one illustrated in the first and second embodiments. Any one of PBT, PVC (polyvinyl chloride), PET (polyethylene terephthalate) and PPS (polyphenylene sulfide) can be, for example, selected as the material of the first function portion. Any one of PP, PE (polyethylene), PS (polystyrene) and PA (polyamide) can be, for example, selected as the material of the material of the second function portion.

LIST OF REFERENCE NUMERALS

A . . . connector

B . . . connector

10 . . . terminal fitting
11 . . . terminal body portion
12 . . . crimping portion
13 . . . wire
20 . . . housing
21 . . . housing body
22 . . . lock arm
23 . . . supporting portion
24 . . . terminal accommodation chamber
25 . . . terminal holding portion
26 . . . locking lance
27 . . . mounting hole
28 . . . retainer
30 . . . first function portion
31 . . . front accommodating portion
32 . . . second function portion
34 . . . rear accommodating portion
34 . . . arm-like holding portion
35 . . . first center anchor portion (anchor portion)
36 . . . first side anchor portion (anchor portion)
37 . . . second center anchor portion (anchor portion)
38 . . . second side anchor portion (anchor portion)
40 . . . mating housing
41 . . . receptacle
42 . . . lock hole
50 . . . terminal fitting
51 . . . terminal body portion
52 . . . crimping portion
53 . . . wire
60 . . . housing
61 . . . housing body
62 . . . lock arm
63 . . . supporting portion
64 . . . arm portion
65 . . . terminal accommodation chamber
66 . . . locking lance
67 . . . mounting hole
68 . . . retainer
70 . . . first function portion
71 . . . retaining member
72 . . . base portion
75 . . . second function portion
80 . . . first center anchor portion (anchor portion)
81 . . . first front anchor portion (anchor portion)
82 . . . projection
83 . . . coupling portion
84 . . . first rear anchor portion (anchor portion)
85 . . . second center anchor portion (anchor portion)
86 . . . second front anchor portion (anchor portion)
87 . . . second rear anchor portion (anchor portion)
88 . . . front wall portion
89 . . . tab insertion opening
90 . . . jig insertion opening
95 . . . mating housing
96 . . . receptacle
97 . . . lock hole

What is claimed is:

1. A connector, comprising:
a terminal fitting; and
a housing for holding the terminal fitting,
the housing including a first portion made of a flexible synthetic resin material and a second portion made of a synthetic resin material having a smaller specific weight than the first portion,
wherein the first portion includes a lock arm for holding the housing and a mating housing in a connected state, and
anchor portions for integrating the first and second portions are formed on a supporting portion serving as a deflection fulcrum of the lock arm.

2. The connector of claim 1, wherein the first and second portions are integrated by two-color molding.

3. The connector of claim 2, wherein the first and second portions include the anchor portions for holding the first and second portions in an integrated state by being fit to each other.

4. The connector of claim 1, wherein a volume of the first portion is smaller than that of the second portion.

5. The connector of claim 1, wherein:
the housing includes a terminal accommodation chamber for accommodating the terminal fitting and a locking lance for retaining the terminal fitting by locking the terminal fitting in the terminal accommodation chamber,
the first portion is formed with a terminal holding portion constituting the terminal accommodation chamber, the terminal holding portion holding a part of the terminal fitting in a fitting state, and
the locking lance is integrally formed to the first portion.

6. A connector, comprising:
a terminal fitting; and
a housing for holding the terminal fitting,
the housing including a first portion made of a flexible synthetic resin material and a second portion made of a synthetic resin material having a smaller specific weight than the first portion,
wherein the housing includes a terminal accommodation chamber for accommodating the terminal fitting and a locking lance for retaining the terminal fitting by locking the terminal fitting in the terminal accommodation chamber,
the first portion is formed with a terminal holding portion constituting the terminal accommodation chamber, the terminal holding portion holding a part of the terminal fitting in a fitting state,
the locking lance is integrally formed to the first portion,
a plurality of the terminal accommodation chambers are arranged side by side in a width direction of the housing, and
anchor portions for integrating the first and second portions are arranged in both end parts and a central part in the width direction of the housing.

7. A connector, comprising:
a terminal fitting; and
a housing for holding the terminal fitting,
the housing including a first portion made of a flexible synthetic resin material and a second portion made of a synthetic resin material having a smaller specific weight than the first portion,
wherein the housing includes a terminal accommodation chamber for accommodating the terminal fitting, a locking lance for retaining the terminal fitting by locking the terminal fitting in the terminal accommodation chamber and a lock arm for holding the housing and a mating housing in a connected state, and
the first portion includes a retaining member constituting a part of an inner wall part of the terminal accommodation chamber and integrally formed with the locking lance, and the lock arm arranged apart from the retaining member.

8. The connector of claim 7, wherein:
the first portion includes a plurality of the retaining members, and the plurality of retaining members are arranged apart from each other.

* * * * *